(12) United States Patent
Gans et al.

(10) Patent No.: US 6,438,043 B2
(45) Date of Patent: *Aug. 20, 2002

(54) ADJUSTABLE I/O TIMING FROM EXTERNALLY APPLIED VOLTAGE

(75) Inventors: Dean Gans; Eric J. Stave; Joseph Thomas Pawlowski, all of Boise, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,720

(22) Filed: Sep. 2, 1998

(51) Int. Cl.7 .................................................. G11C 7/00
(52) U.S. Cl. ..................................... 365/194; 365/225.7
(58) Field of Search ................................ 365/194, 191, 365/76, 93, 189.01, 225.7, 233; 438/132; 711/104, 154, 163, 167, 170, 100, 101; 327/261, 269, 270, 276

(56) References Cited

U.S. PATENT DOCUMENTS

| | | | | |
|---|---|---|---|---|
| 4,748,595 A | * | 5/1988 | Mattausch | 365/194 |
| 5,237,224 A | * | 8/1993 | DeLisle et al. | 327/276 |
| 5,444,666 A | * | 8/1995 | Oh | 365/230.08 |
| 5,479,128 A | * | 12/1995 | Jan et al. | 327/270 |
| 5,493,241 A | * | 2/1996 | Landry et al. | 326/105 |
| 5,502,672 A | * | 3/1996 | Kwon | 365/189.05 |
| 5,596,538 A | * | 1/1997 | Joo | 365/201 |
| 5,646,904 A | * | 7/1997 | Ohno et al. | 365/233 |
| 5,684,809 A | | 11/1997 | Stave et al. | 714/738 |
| 5,757,713 A | | 5/1998 | Gans et al. | 365/226 |
| 5,757,718 A | * | 5/1998 | Suzuki | 365/233.5 |
| 5,793,688 A | * | 8/1998 | McLaury | 365/203 |
| 5,801,985 A | | 9/1998 | Roohparvar et al. | 365/185.01 |
| 5,812,148 A | * | 9/1998 | Takasugi et al. | 345/567 |
| 5,841,789 A | * | 11/1998 | McClure | 714/724 |
| 5,852,379 A | * | 12/1998 | Jiang | 327/176 |
| 5,880,996 A | | 3/1999 | Roohparvar et al. | 365/185.33 |
| 5,889,726 A | * | 3/1999 | Jeddeloh | 365/233 |
| 5,892,720 A | | 4/1999 | Stave et al. | 365/201 |
| 5,898,635 A | * | 4/1999 | Raad et al. | 365/226 |
| 5,930,182 A | * | 7/1999 | Lee | 365/194 |
| 5,978,286 A | * | 11/1999 | Chang et al. | 365/196 |
| 6,052,011 A | * | 4/2000 | Dasgupta | 327/270 |
| 6,061,296 A | * | 5/2000 | Ternullo, Jr. et al. | 365/233 |
| 6,111,796 A | * | 8/2000 | Chang et al. | 365/196 |
| 6,150,863 A | * | 11/2000 | Conn et al. | 327/270 |

* cited by examiner

Primary Examiner—Hong Kim
(74) Attorney, Agent, or Firm—Schwegman, Lundberg, Woessner & Kluth, P.A.

(57) ABSTRACT

An integrated circuit, including but not limited to a memory device, receives an externally provided voltage signal and selectively adjusts the timing of internal control signals. An external signal selects between two possible pre-determined delay paths. The delay paths are adjusted using fuse circuitry which can be programmed by the manufacturer prior to implementation by a user. The delay path adjustment feature is particularly applicable to adjusting output signal timing to allow the integrated circuit to be operated in an environment which requires slower communications speeds. The same integrated circuit, therefore, can also be implemented in an environment which allows for faster communications speeds.

26 Claims, 4 Drawing Sheets

ADJUSTABLE I/O TIMING FROM EXTERNALLY APPLIED VOLTAGE

TECHNICAL FIELD OF THE INVENTION

The present invention relates generally to integrated circuits and in particular the present invention relates to adjusting timing operations of an integrated circuit using an externally applied voltage.

BACKGROUND OF THE INVENTION

Semiconductor memory devices are used in a wide variety of applications. The memory device receives data for storage, and provides stored data to external devices. Typically, the memory device is accessed through a bus by an external device, such as a microprocessor, memory controller, or application-specific integrated circuit. The bus is used to transfer address, data, and control signals between the memory device and the external circuitry accessing the memory device.

High-speed memory devices, such as static random access memories (SRAM) may operate at speeds greater than the capability of external circuitry accessing the SRAM. For example, during a read operation the SRAM may provide data earlier in time than the external circuitry is ready to receive the output data. As a result, bus contention can be experienced where data read from the SRAM is driven onto the bus while other data still resides on the bus. To avoid the undesirable consequences of two or more devices driving relatively high currents on a common bus connection for some conflicting period of time, system designers often include idle time between successive data transfer operations. By inserting idle time, the designer effectively reduces system data access speed. Alternately, system designers match speed specifications of various devices included within the system. As such a system designer may not be able to use a readily available inexpensive memory device in a system having other components which are too slow to match the speed of the memory device.

For the reasons stated above, and for other reasons stated below which will become apparent to those skilled in the art upon reading and understanding the present specification, there is a need in the art for a memory device which can operate at high speeds, or can be adjusted to reduce its speed such that it can be used in a system which is not adapted to take advantage of the memory device's high speed capabilities.

SUMMARY OF THE INVENTION

The above mentioned problems with integrated circuit memory devices and other problems are addressed by the present invention and will be understood by reading and studying the following specification. An integrated circuit is described which adjusts internal timing in response to an external signal.

In particular, the present invention describes an integrated circuit comprising an input connection for receiving an externally provided voltage signal, internal circuitry for providing an internal signal, and control circuitry selectively coupled to receive the externally provided voltage signal and select between a plurality of possible delay paths for internally communicating the internal signal.

In another embodiment, an integrated circuit memory device comprises an input connection for receiving an externally provided voltage signal, internal circuitry for providing an internal signal, and a delay circuit for receiving the internal signal as an input signal and providing an output signal at an output node. The delay circuit has a plurality of possible delay paths for communicating the input signal to the output node. The memory also includes control circuitry selectively coupled to receive the externally provided voltage signal and select one of the plurality of possible delay paths for the internal signal in response to the externally provided voltage signal.

In yet another embodiment, a method of operating an integrated circuit is described. The method comprises receiving an externally provided signal, selecting a first internal communication path for a control signal if the externally provided signal is in a first state, and selecting a second internal communication path for a control signal if the externally provided signal is in a second state.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

An integrated circuit memory which can be operated at different speeds is described herein. The memory device can be a static random access memory (SRAM) which can be adjusted to operate at "fast" and "slow" cycle times. The memory can be, but is not limited to, a DRAM, SDRAM, burst memory, or other memory devices. An externally supplied voltage is used to switch the memory device between the different operating speed capabilities. Detailed descriptions of one embodiment of the SRAM, delay circuitry, and a possible delay stage circuit are provided in the following specification.

Figure 1:
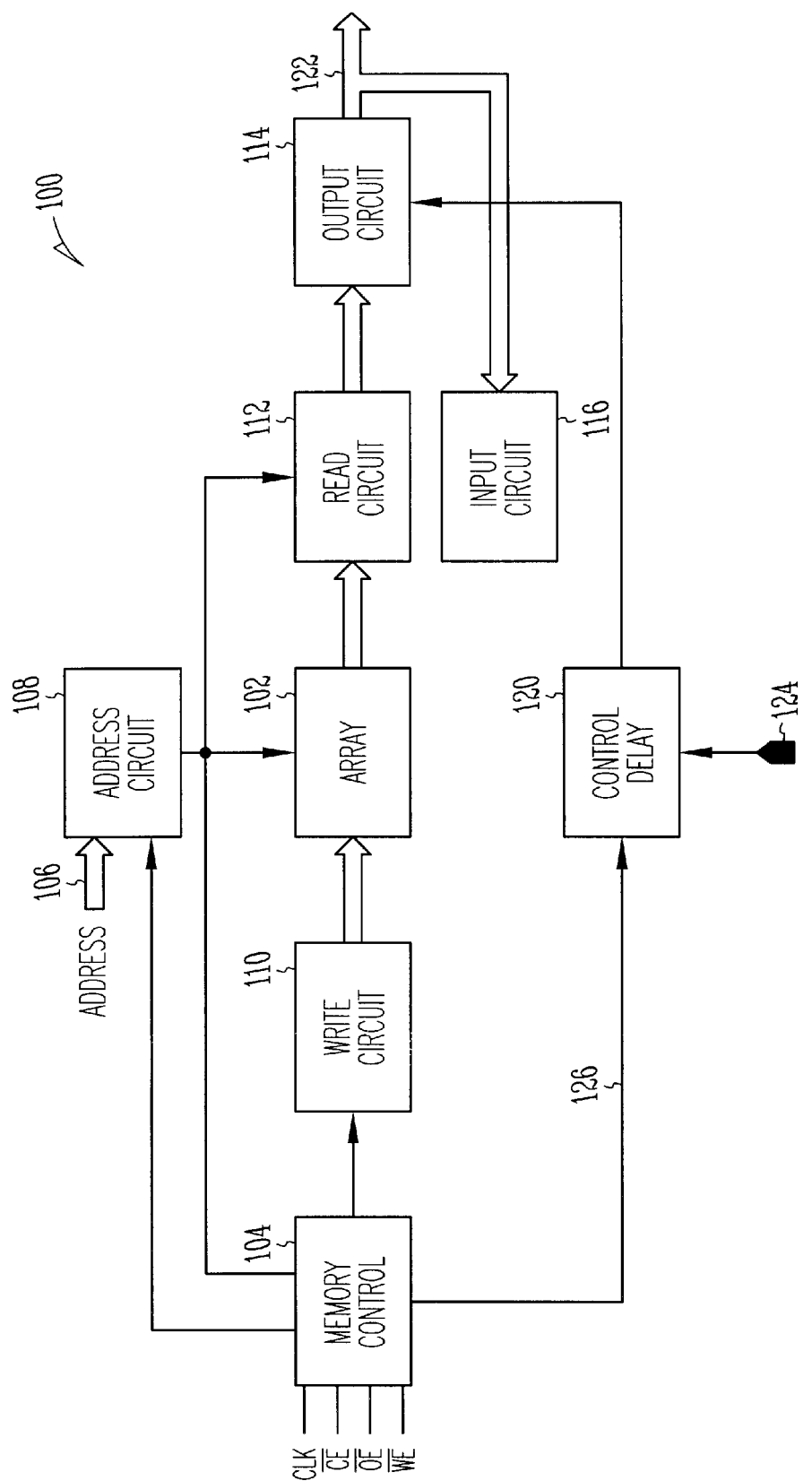
FIG. 1 is a block diagram of one embodiment of the memory device.

FIG. 1 illustrates one embodiment of an SRAM 100 incorporating externally controlled data timing adjustments. The memory includes a memory cell array 102 and operates in accordance with a plurality of the internal control signals produced by control circuitry 104. A device external to the memory applies a plurality of command signals to control circuitry, including well-known signals such as write-enable (WE*), output enable (OE*), and chip enable (CE*). The memory control circuitry also receives a system clock signal, and additional control signals for various memory functions.

Address signals are applied to the memory device on an address bus 106. The address signals may be a single address, as in the case of an SRAM, or may be timemultiplexed for dynamic random access memory (DRAM) applications. In response to one or more control signals provided by the memory control circuitry, the address circuitry 108 decodes the address signal, selects corresponding locations within the memory array, and initiates access to these memory locations. As is known to those skilled in the art, the depicted address circuitry includes a variety of functional components particular to the memory device type. For example, the address circuitry can include an address burst counter or multiplexer circuitry, together with activation and address select circuitry appropriate to the particular memory device type.

In response to one or more control signals provided by the memory control circuitry, write circuitry 110 writes data to address locations within the memory array. Those skilled in the art recognize that the depicted write circuitry can include a variety of functional components particular to the memory device type implemented. For example, write circuitry 110 might include write enable circuitry and write driver circuitry. In response to one or more control signals provided by the memory control circuitry, read circuitry 112 retrieves data stored in the address locations within the memory cell array. Again, the write circuitry can include a variety of functional circuit components particular to the memory device. For example, the read circuitry can include sense amplifier circuitry and I/O gate circuitry.

Output circuitry 114 is provided to couple data read from the memory cell array to I/O data lines 122. Likewise input circuitry 116 is provided to couple data provided on the I/O lines to the write circuitry for storage in an addressed memory array location. The data output circuitry receives data retrieved by the read circuitry and provides the data to external devices via the data bus.

In accordance with one embodiment of the present invention, an adjustable control signal delay circuit 120 is included within the memory device. The control signal delay circuit receives a control signal 124 and adjusts a time delay of an internal signal 126 coupled through the delay circuit to the output circuitry. Thus, the timing of data transferred from the read circuitry to the data output circuitry can be adjusted using the delay circuit. In another embodiment, the control signal delay circuit can be used to adjust timing of a variety of internal control signals, and is not limited to control signals associated with the output circuitry. The control signal delay circuit is operated in response to an externally provided voltage coupled to an input connection of the memory device.

Figure 2:
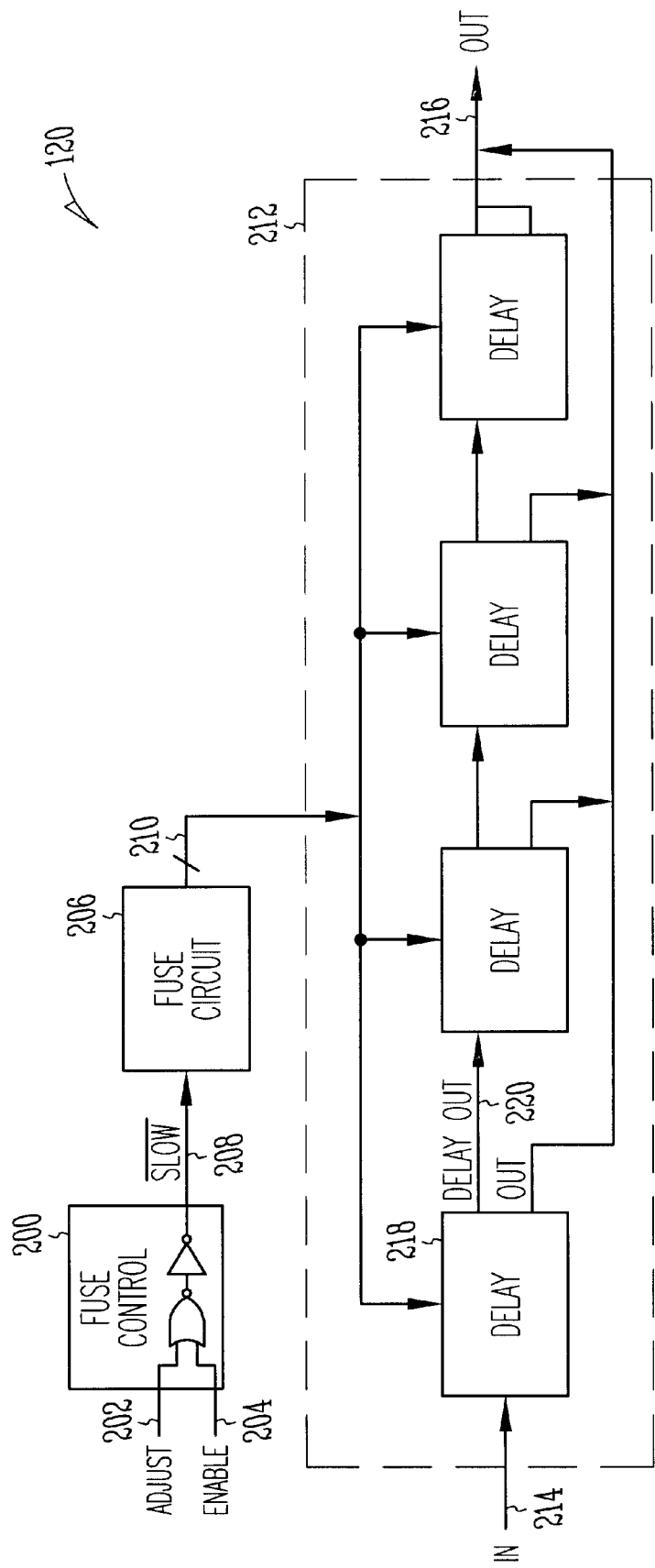
FIG. 2 illustrates delay circuitry provided in the memory device of FIG. 1.

Referring to FIG. 2, one embodiment of the control signal delay circuit 120 is described in greater detail. The control signal delay circuit includes a fuse control circuit 200, fuse circuitry 206, and adjustable series delay circuit 212. The fuse control circuit 200 receives two externally provided signals, Adjust 202 and Enable 204. The Enable signal is used to place the memory device into an adjustable state, such that operating speeds of the memory device can be controlled in response to the Adjust signal. The fuse control circuit, in one embodiment, can include a dual input NOR gate coupled to receive both the Adjust and Enable signals. An output of the NOR gate would be coupled to an inverter, which provides the active low output signal 208. It will be appreciated by those skilled in the art that other circuitry can be provided which allows the externally provided Adjust signal to control an internal signal 208, and is not limited to the series connected NOR and invertor.

The fuse adjust circuitry 206 receives the timing adjust signal on input line 208, and provides in response thereto a plurality of output signals 210. The fuse adjust circuitry preferably comprises a plurality of fuse circuits which are adjusted by the memory device manufacturer to allow the memory device to operate at speeds specified by the end-user. That is, fuse circuitry 206 can be programmed such that a predetermined binary signal is provided on outputs 210 in response to a state of input signal 208 because different system designers require different operating speeds. The binary signal is used to selectively adjust the series delay circuit 212. In a preferred embodiment, outputs 210 comprise three control lines. These three control lines are decoded to select one or more delay circuits 218 of the series delay circuit 212.

If the Enable signal is deactivated (high), the outputs of fuse circuitry 206 are set to predetermined values as defined by programmed and unprogrammed internal fuses. It is anticipated that the predetermined values will control the series delay circuit in a manner to provide the fastest operating speed for the memory,. When the Enable signal is activated (low), the output of fuse control circuit 200 is generated in response to a state of the Adjust signal 202. In one mode, the outputs of fuse circuitry 206 maintains the predetermined values such that the memory operates at its fastest speed. In a second mode, the fuse control circuit 200 provides an output signal 208, in response to the Adjust signal, which changes the outputs 210 of the fuse circuitry to second predetermined values. In a preferred embodiment, the second predetermined values place the memory device in a "slow" speed operation mode. Again, the second predetermined output values 210 control the series delay circuit 212. The number of delay circuits 218, therefore, which are actively coupled between input connection 214 and output connection 216 are controlled by the output values provided on lines 210. It will be appreciated that the delay circuit 212 is provided in different locations on the integrated circuit where signals need to be delayed proportionally to enable the SRAM to function properly at the slower cycle time determined by the state of the Adjust signal. For example, the memory array access time, the output low-z time, and the output switching time, known to those skilled in the art, may all require separate signal delay circuits.

Figure 3:
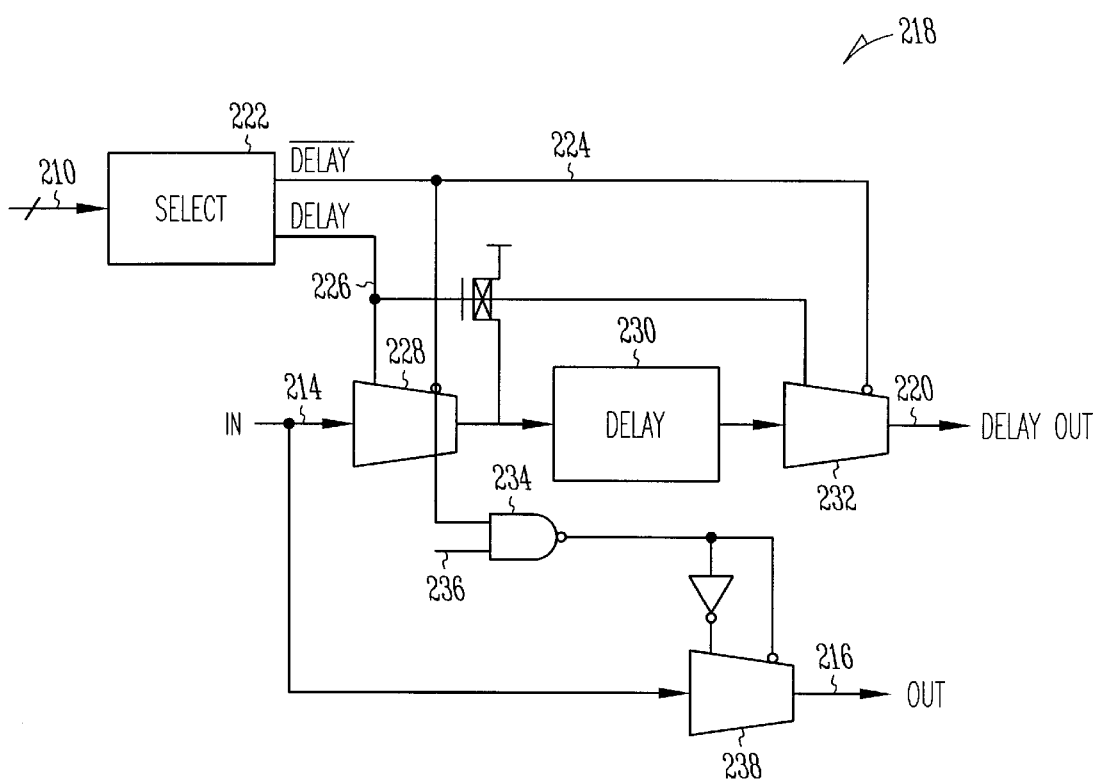
FIG. 3 is a schematic diagram of one embodiment of a delay stage circuit.

Referring to FIG. 3, a more detailed description of one embodiment of delay circuit 218 is provided. The delay circuit includes select circuitry 222 which decodes signals provided on one or more of the output lines 210 and provides complementary delay control output signals 224 and 226. The select circuitry 222 preferably includes logic circuitry to decode output lines 210. The specific logic circuitry can vary from embodiment to embodiment, and a specific embodiment is not considered key to understanding or implementing the present invention.

If the delay circuit 218 is selected, delay signal 226 is in an active high state such that multiplex circuits 228 and 232 are active. A control signal therefore which is received on input 214 is coupled to output connection 220 via time delay circuit 230. If the delay circuit 218 is not selected, such that delay signal 226 is low, multiplex circuits 228 and 232 are deactivated. NAND gate 234 and multiplex circuit 238 are provided to couple a signal from input 214 to the output connection 216 without any appreciable delay. Input connection 236 of the NAND gate 234 is coupled to the delay signal 226 of the previous delay circuit 218 of the series 212. An operation, if a previous delay circuit is selected NAND input 236 is pulled to a high state. The output of the NAND gate, therefore, follows the inverse of the complement delay signal 224. If the present delay circuit is not selected, the output of the NAND gate will be low to activate multiplex circuit 238. The input signal 214 is therefore coupled to the output connection 216 without passing through delay circuit 230. It will be appreciated by those skilled in the art by referring to FIG. 2, that an input signal received on input 214 can pass-through several delay circuits 218 before being coupled to output connection 216. If less than all of the series connected delay circuits 218 are used to delay the control signal, one delay circuit 218 is used to couple the delayed control signal 220 to connection 216 through multiplex circuit 238.

The above described series coupled delay circuit 212, and individual delay circuits 218 are just two embodiments which can be implemented using the present invention. Modifications can be made without departing from the present invention. An integrated circuit, such as a memory device, can be provided which includes internal circuitry for selecting a delay path of an internal control signal in response to at least one externally provided voltage signal. While the internal control signal is not limited to a specific type of signal, it is preferred that the signal be related to data output operations. Further, while the memory device described above receives a single Adjust signal 202 to select between one of two control signal delay paths, multiple Adjust signals can be provided to select between a plurality of operating speeds.

Figure 4:
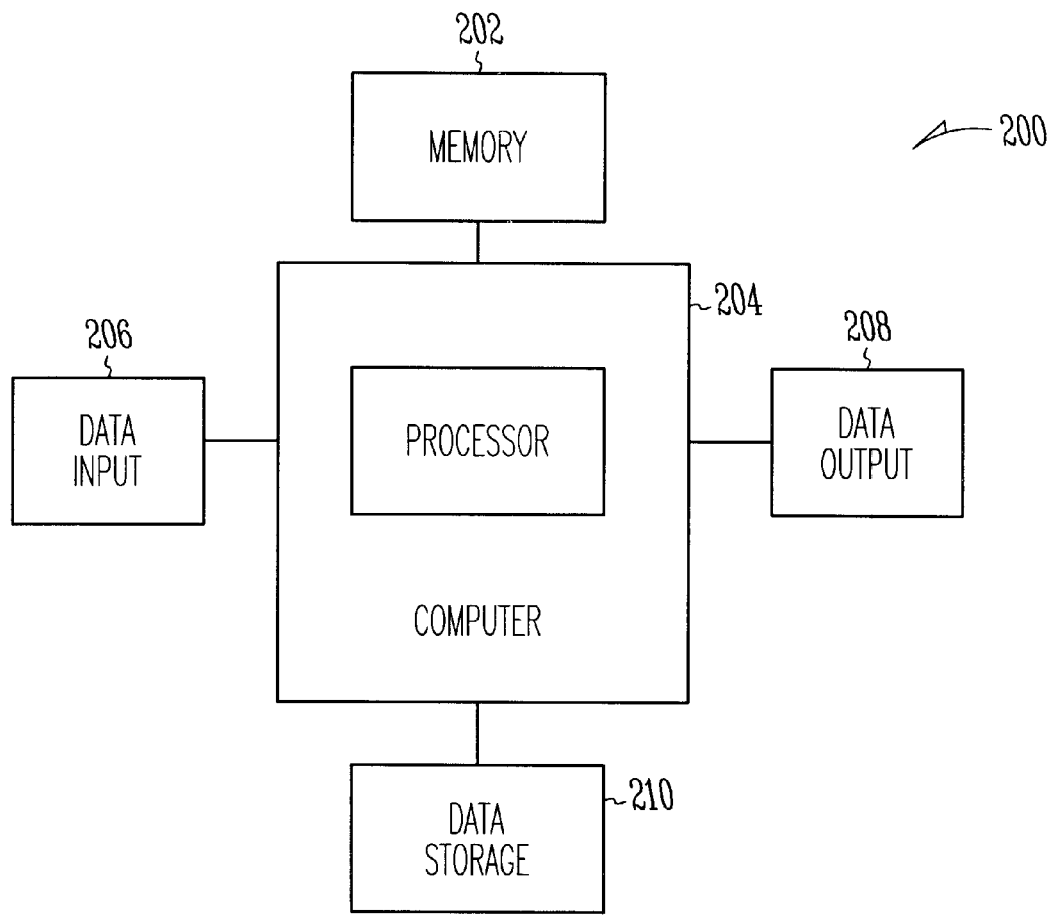
FIG. 4 is a block diagram of a data processing system.

FIG. 4 illustrates a data processing system depicting a computer system 200 which includes a memory device 202 constructed in accordance with the present invention. For example, the memory device 202 could be of configuration similar to the memory device 100 and equivalents described above. The memory device can operate as a cache memory, as known to those skilled in the art. The computer system 200 includes computer circuitry 204 for performing such functions as executing software to accomplish desired calculations and tasks. The computer circuitry 204 includes at least one processor and is coupled to the memory device 202, as shown. A data input device 206 is coupled to the computer circuitry 204 to allow an operator to manually input data thereto. Examples of data input devices include a keyboard and a pointing device. A data output device 208 is coupled to the computer circuitry to provide data generated by the computer circuitry to the operator. Examples of data output devices include a printer and a video display unit. A data storage device 210 is coupled to the computer circuitry to store data and/or retrieve data from external storage media. Examples of storage devices and associated storage media include drives that accept hard and floppy disks, magnetic tape recorders, and compact-disc read-only memory (CD-ROM) drives.

CONCLUSION

An integrated circuit, including but not limited to a memory device, has been described which receives an externally provided voltage signal and selectively adjusts the timing of internal control signals. A single external signal was described for selecting between two possible delay paths. The specific delay paths were predetermined and adjusted using fuse-type circuitry. This fuse circuitry can be programmed by the manufacturer prior to implementation by a user. The delay path adjustment feature was described as being particularly applicable to adjusting output signal timing to allow the integrated circuit to be operated in an environment which requires slower communications speeds. The same integrated circuit, therefore, can also be implemented in an environment which allows for faster communications speeds.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An integrated circuit memory device comprising:
    an input connection for receiving an externally provided voltage signal;
    read circuitry for reading data stored in the memory device;
    data output circuitry for providing data read from the memory device to an external connection;
    internal circuitry for providing an internal signal to control the data output circuitry;
    an adjustable delay circuit for receiving the internal signal as an input signal and providing an output signal at an output node, the adjustable delay circuit has a plurality of possible delay paths for communicating the input signal to the output node, the plurality of possible delay paths including a plurality of delay circuits each having at least two output connections and a select circuit, at least one of the at least two output connections being electrically common with the output node;
    control circuitry selectively coupled to receive the externally provided voltage signal; and
    an encoded signal output from the control circuitry that is decoded by each of the select circuits to determine which of the at least two output connections the input signal will be communicated along en route to the output node, wherein an operating speed of the data output circuitry is adjusted by the internal signal.

2. The integrated circuit of claim 1 wherein lengths of the plurality of possible delay paths are predetermined and adjusted using fuse circuitry.

3. The integrated circuit of claim 1 wherein the internal signal adjusts output signal timing to allow the integrated circuit to operate at one of a plurality of different communications speeds.

4. The integrated circuit of claim 1 wherein the plurality of delay circuits are serially connected.

5. An integrated circuit memory device comprising:
    an input connection for receiving an externally provided voltage signal;
    data output circuitry for providing data read from the memory device to an external connection;
    internal circuitry for providing an internal signal to control the data output circuitry;
    an adjustable delay circuit for receiving the internal signal as an input signal and providing an output signal at an output node, the adjustable delay circuit has a plurality of possible delay paths for communicating the input signal to the output node, the plurality of possible delay paths including a plurality of delay circuits each having at least two output connections and a select circuit, at least one of the at least two output connections being electrically common with the output node;
    control circuitry selectively coupled to receive the externally provided voltage signal and select one of the plurality of possible delay paths for the internal signal in response to the externally provided voltage signal, wherein an operating speed of the data output circuitry is adjusted by the internal signal; and
    an encoded signal to be output from the control circuitry that is decoded by each of the select circuits, as the control circuitry selects one of the plurality of possible delay paths, to determine which of the at least two output connections the input signal will be communicated along en route to the output node.

6. The integrated circuit memory device of claim 5 wherein the control circuitry comprises:
   a fuse circuit for selecting a first one of the plurality of possible delay paths when the externally provided voltage signal is in a first state, and a second one of the plurality of possible delay paths when the externally provided voltage signal is in a second state.

7. The integrated circuit memory device of claim 6 wherein the internal signal controls data output, such that the first delay path operates the integrated circuit memory device at a first communication speed, and the second delay path operates the integrated circuit memory device at a second communication speed.

8. The integrated circuit memory of claim 5 wherein the plurality of delay circuits are serially connected.

9. The integrated circuit memory of claim 8 wherein the encoded signal includes a plurality of output signals for selectively activating the serially connected plurality of delay circuits.

10. The integrated circuit memory device of claim 5 further comprising an enable circuit for coupling the externally provided voltage signal to the control circuitry.

11. The integrated circuit memory device of claim 5 wherein the memory device is a synchronous random access memory (SRAM).

12. A data processing system comprising:
    a processor; and
    a memory device coupled to the processor, the memory device comprising:
       an input connection for receiving an externally provided voltage signal;
       read circuitry for reading data stored in the memory device;
       data output circuitry for providing data read from the memory device to an external connection for access by the processor;
       internal circuitry for providing an internal signal to control the data output circuitry;
       an adjustable delay circuit for receiving the internal signal as an input signal and providing an output signal at an output node, the adjustable delay circuit has a plurality of possible delay paths for communicating the input signal to the output node, the plurality of possible delay paths defined by a plurality of delay circuits each having at least two output connections and a select circuit, at least one of the at least two output connections being electrically common with the output node;
       control circuitry selectively coupled to receive the externally provided voltage signal; and
       an encoded signal output from the control circuitry that is decoded by each of the select circuits to determine which of the at least two output connections the input signal will be communicated along en route to the output node, wherein an operating speed of the data output circuitry is adjusted by the internal signal.

13. The data processing system of claim 12 wherein the plurality of delay circuits are serially connected and wherein the internal signal controls data output such that a first delay path operates the integrated circuit memory device at a first communication speed, and a second delay path operates the integrated circuit memory device at a second communication speed.

14. The data processing system of claim 12 wherein the memory device is a synchronous random access memory (SRAM).

15. The data processing system of claim 14 wherein the SRAM operates as a cache memory.

16. A method of operating a memory integrated circuit device, comprising:
    receiving an externally provided signal at a control circuit;
    reading data stored in the memory device;
    providing data read from the memory device to an external connection;
    encoding an output of the control circuit after receiving the externally provided signal;
    providing a plurality of delay circuits within an adjustable delay circuit of the memory device each having a select circuit and at least two output connections;
    selecting a first internal communication delay path along one of the at least two output connections for a control signal by decoding the output of the control circuit if the externally provided signal is in a first state;
    selecting a second internal communication delay path along another of the at least two output connections for a control signal by decoding the output of the control circuit if the externally provided signal is in a second state; and
    controlling the speed at which the data is provided to the external connection in response to the control signal.

17. The method of claim 16 wherein the control signal controls data output communication speed.

18. The method of claim 17 wherein the integrated circuit comprises series coupled delay paths which define the first and second internal communication paths.

19. A method of selecting a data output speed of a memory device, comprising:
    receiving an externally provided signal at a control circuit;
    reading data stored in the memory device;
    providing data read from the memory device to an external connection;
    encoding an output of the control circuit after receiving the externally provided signal;
    providing a plurality of delay circuits within an adjustable delay circuit of the memory device each having a select circuit and at least two output connections;
    adjusting the adjustable delay circuit in response to the output, such that the adjustable delay circuit couples a control signal by decoding the output of the control circuit in one of the select circuits to a delay output via a first delay path along one of the at least two output connections when the externally provided signal is in a first state, and the delay circuit couples the control signal by decoding the output of the control circuit in another of the select circuits to the delay output via a second delay path along another of the at least two output connections when the externally provided signal is in a second state; and
    controlling a speed of a data output circuit in response to signals provided at the delay output to control the rate of data provided to the external connection.

20. The method of claim 19 wherein the memory device comprises a fuse circuit for the encoding of the output.

21. The method of claim 20 wherein the output is a multiple bit signal for selecting the first or second delay path.

22. A method of operating a data processing system, the system including a processor, a memory device coupled to the processor and having an input, data output circuitry for reading data from the memory device to the processor, and internal circuitry for providing an output internal signal to control the data output circuitry, the method comprising:

applying an external voltage to the input of the memory device;

encoding an output of a control circuit of the internal circuitry in response to the applying the external voltage;

receiving, within the memory device, an internal input signal and deriving therefrom the output internal signal;

providing a plurality of delay circuits within the memory device each having a select circuit and at least two output connections;

decoding the output within each of the select circuits;

delaying the internal input signal by an amount related to the character of the external voltage to delay the appearance of the output internal signal, to adjust the operating speed of the data output circuitry.

23. The method of claim 22, wherein the delaying step is effected by transmitting the internal input signal on a selected one of several paths.

24. The method of claim 23, wherein the paths are defined by a fuse circuit.

25. An integrated circuit for inclusion in a memory device of a data processing system, the data processing system also including a processor, read circuitry for reading data stored in the memory device, and data output circuitry for effecting data read from the memory device to a point accessible by the processor, the integrated circuit comprising:

an input connection for receiving an externally provided voltage signal;

internal circuitry for providing an internal signal by which the data output circuitry is controllable;

an adjustable delay circuit for receiving the internal signal as an input signal and providing an output signal at an output node, the adjustable delay circuit having a plurality of possible delay paths for communicating the input signal to the output node, the plurality of possible delay paths including a plurality of delay circuits each having at least two output connections and a select circuit, at least one of the at least two output connections being electrically common with the output node;

control circuitry at which the externally provided voltage signal is receivable to select between the plurality of possible delay paths for internally communicating the internal signal; and an encoded signal output from the control circuitry that is decoded by each of the select circuits to determine which of the at least two output connections the input signal will be communicated along en route to the output node.

26. An integrated circuit memory device for inclusion in a data processing system, the data processing system also including a processor, read circuitry for reading data stored in the memory device, and data output circuitry for effecting data read from the memory device to a point accessible by the processor, the integrated circuit memory comprising:

an input connection for receiving an externally provided voltage signal;

internal circuitry for providing an internal signal to control the data output circuitry;

an adjustable delay circuit for receiving the internal signal as an input signal and providing an output signal at an output node, the adjustable delay circuit having a plurality of possible delay paths for communicating the input signal to the output node, the plurality of possible delay paths including a plurality of delay circuits each having at least two output connections and a select circuit, at least one of the at least two output connections being electrically common with the output node;

control circuitry selectively coupled to receive the externally provided voltage signal; and an encoded signal output from the control circuitry that is decoded by each of the select circuits to determine which of the at least two output connections the input signal will be communicated along en route to the output node, the output speed of the data output circuitry being adjustable by the internal signal.

* * * * *